United States Patent
Williams et al.

(10) Patent No.: US 7,401,788 B2
(45) Date of Patent: Jul. 22, 2008

(54) HIGH PRESSURE AND TEMPERATURE SEAL FOR DOWNHOLE USE

(75) Inventors: Ronald D. Williams, Broken Arrow, OK (US); Edward Wayne Welch, Jr., Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/842,728

(22) Filed: Aug. 21, 2007

(65) Prior Publication Data

US 2008/0029264 A1 Feb. 7, 2008

Related U.S. Application Data

(63) Continuation of application No. 10/443,489, filed on May 22, 2003, now abandoned.

(51) Int. Cl.
*E21B 33/128* (2006.01)

(52) U.S. Cl. ............................. 277/342; 277/647

(58) Field of Classification Search ................ 277/342, 277/619, 530, 531, 647; 166/179
See application file for complete search history.

(56) References Cited

U.S. PATENT DOCUMENTS

| | | | |
|---|---|---|---|
| 2,320,589 A * | 6/1943 | Gruet | 277/342 |
| 2,610,846 A | 9/1952 | Hanna | |
| 2,895,758 A | 7/1959 | Wright | |
| 3,002,565 A * | 10/1961 | Moore, Jr. | 166/217 |
| 3,467,394 A | 9/1969 | Bryant | |
| 3,520,542 A | 7/1970 | Fruehauf | |
| 4,133,542 A | 1/1979 | Janian et al. | |
| 4,143,883 A | 3/1979 | Paynter | |
| 4,164,977 A * | 8/1979 | Arendt et al. | 166/125 |
| 4,234,197 A * | 11/1980 | Amancharla | 244/124 |
| 4,281,840 A | 8/1981 | Harris | |
| 4,406,469 A * | 9/1983 | Allison | 277/342 |
| 4,437,522 A * | 3/1984 | Krause et al. | 166/382 |
| 4,441,721 A | 4/1984 | Harris et al. | |
| 4,509,763 A | 4/1985 | Fischer | |
| 4,592,558 A | 6/1986 | Hopkins | |
| 4,630,636 A | 12/1986 | Cutcher | |
| 4,697,640 A | 10/1987 | Szarka | |
| 4,811,959 A | 3/1989 | Bullard et al. | |
| 4,921,045 A | 5/1990 | Richardson | |
| 4,928,761 A * | 5/1990 | Gazda et al. | 166/123 |
| 5,297,805 A * | 3/1994 | Merkin et al. | 277/322 |
| 5,309,993 A * | 5/1994 | Coon et al. | 166/115 |
| 5,509,476 A * | 4/1996 | Vick, Jr. | 166/75.13 |
| 5,984,316 A | 11/1999 | Balsells | |
| 6,318,729 B1 | 11/2001 | Pitts, Jr. et al. | |
| 6,406,028 B1 * | 6/2002 | Kannan | 277/361 |
| 6,869,079 B2 | 3/2005 | Zheng | |
| 2002/0070503 A1 | 6/2002 | Zimmerman et al. | |

* cited by examiner

*Primary Examiner*—William L. Miller
(74) *Attorney, Agent, or Firm*—Steve Rosenblatt

(57) ABSTRACT

A seal for use in temperature and pressure extremes is disclosed. It features springs internal to the sealing members and the ability to seal against pressure differentials from opposed directions. A spacer ring prevents contact from oppositely oriented seal components and at the same time prevents spring and seal collapse under extreme loading conditions. The seal assembly is self-centering in a downhole seal bore and can be used on tools delivered on wireline, where the insertion forces available are at a minimum. The seal can withstand pressure differentials in excess of 13,500 PSI and temperatures above 350 degrees Fahrenheit.

13 Claims, 2 Drawing Sheets

HIGH PRESSURE AND TEMPERATURE SEAL FOR DOWNHOLE USE

PRIORITY INFORMATION

This application is a continuation application claiming priority from U.S. patent application Ser. No. 10/443,489, filed on May 22, 2003, which claims the benefit of U.S. Provisional Application No. 60/384,601, filed on May 30, 2002.

FIELD OF THE INVENTION

The field of this invention is a seal for use in temperatures of over 300 degrees Fahrenheit and over 10,000 pounds per square inch (PSI) and more particularly a seal adapted for wireline use where insertion forces are limited.

BACKGROUND OF THE INVENTION

Currently, in downhole applications, there are different types of seals to handle high temperature and pressure applications. The present limits of service of these designs are roughly about 350 degrees Fahrenheit and about 13,500 PSI. Under more severe temperature or/and pressure conditions, the presently known designs have been tested and have failed to perform reliably.

Depending on the application, there are different types of seals for high temperatures or/and pressures. In the case of packers set in high temperature applications, U.S. Pat. No. 4,441,721 asbestos fibers impregnated with Inconel wire are used in conjunction with a stack of Belleville washers to hold the set under temperature extremes. Apart from packers or bridge plugs which require seal activation after placement in the proper position, there are other applications involving seals on tools that have to engage a seal bore receptacle downhole and still need to withstand these extremes of temperature and pressure. In many cases, the tool with the seal to land in a seal bore is delivered on wireline. This means that insertion forces are limited because minimal force can be transmitted from the surface through wireline. In these applications, the limited insertion force is a design parameter that has to be counterbalanced with the frictional resistance to insertion created by the interference of the seal in the seal bore. This interference is built into the design of the seal to allow sufficient contact with the seal bore after insertion for proper seal operation. Clearly if the interference is too great the insertion, particularly with a wireline, will become problematic. On the other hand, reducing the interference can result in seal failure under the proposed extreme conditions of pressure and temperature.

There are other design considerations for seals that engage a seal bore downhole. Clearly, on the trip downhole, the seal is exposed to mechanical contact with well tubulars or other equipment. The materials for the seal must be rugged enough to withstand such mechanical impacts as well as to withstand the temperatures and pressures anticipated in the downhole location.

These seals also need to control extreme pressure differentials in an uphole and a downhole direction. Such seals may be inserted and removed from several seal bores during their service life. The design has to be flexible enough to allow long service periods under such extreme conditions as well as the resiliency to allow removal and reinsertion without damage to the seal or the surrounding seal bore.

FIG. 1 illustrates the current commercially available seal that is promoted for severe duty applications. It illustrates a mirror image arrangement around a central adapter 16. A pair of chevron packing rings 14 are disposed about the adapter 16 and outside of the rings 14 is a back-up v-ring 12 and outside of v-ring 12 is an end ring 10 to complete one half of the mirror image arrangement shown in FIG. 1. The open portions of the v-shaped rings open toward the central adapter in an effort to position the rings to withstand pressure differentials from opposite directions. The rings are made of materials suitable for the anticipated temperatures. Tests at pressure extremes of over 13,500 PSI and temperatures above 350 degrees Fahrenheit revealed that this design was unsuitable for reliable service.

In an effort to improve on the performance of the seal shown in FIG. 1, the design of FIG. 2 was tried. It featured a central o-ring 18 surrounded by a pair of center adapters 20. On either side of the center adapters 20 the arrangement was similar to FIG. 1 except that the orientation of the v-shaped opening were now all away from the central o-ring 18 rather than towards each other as had been the case in the design of FIG. 1. Additionally, there was an alternating pattern of material in the rings 22 and 24 of FIG. 2 as compared to the stacking of rings 14 of a like material as shown in FIG. 1. This design of FIG. 2 showed improved performance in high temperature and pressure conditions but was not to be the final solution. The present invention, an illustrative example of which is discussed in the preferred embodiment below, addresses the temperature and pressure extremes while allowing for insertion using a wireline. It features an internal spring mechanism and a feature that prevents collapse of the spring and the sealing elements under extreme conditions. The opposing members in the assembly are also prevented from engaging each other under extreme conditions. The collapse-preventing feature also has a beneficial aspect of seal centralization as the seal is inserted into the seal bore. Those skilled in the art from a review of the description of the preferred embodiment below and the claims that appear thereafter will readily understand these and other beneficial features of the present invention.

SUMMARY OF THE INVENTION

A seal for use in temperature and pressure extremes is disclosed. It features springs internal to the sealing members and the ability to seal against pressure differentials from opposed directions. A spacer ring prevents contact from oppositely oriented seal components and at the same time prevents spring and seal collapse under extreme loading conditions. The seal assembly is self-centering in a downhole seal bore and can be used on tools delivered on wireline, where the insertion forces available are at a minimum. The seal can withstand pressure differentials in excess of 13,500 PSI and temperatures above 350 degrees Fahrenheit.

DETAILED DESCRIPTION OF THE PREFERRED EMBODIMENT

Figure 1:
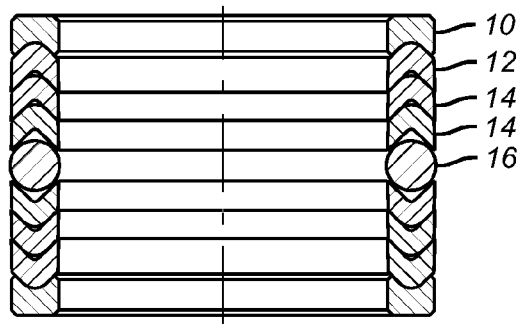
FIG. 1 is a section view of a prior art seal for extreme temperature and pressure conditions.
Figure 2:
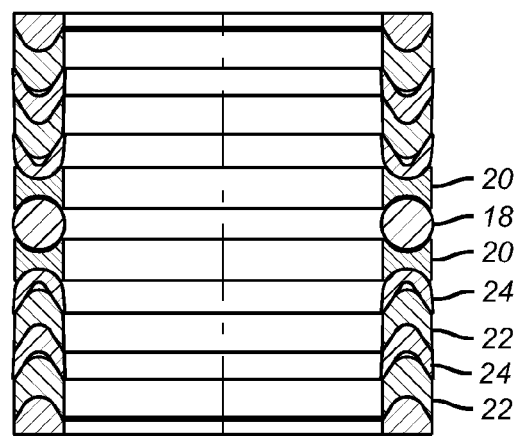
FIG. 2 is an early version of the present invention developed by the inventors.
Figure 3:
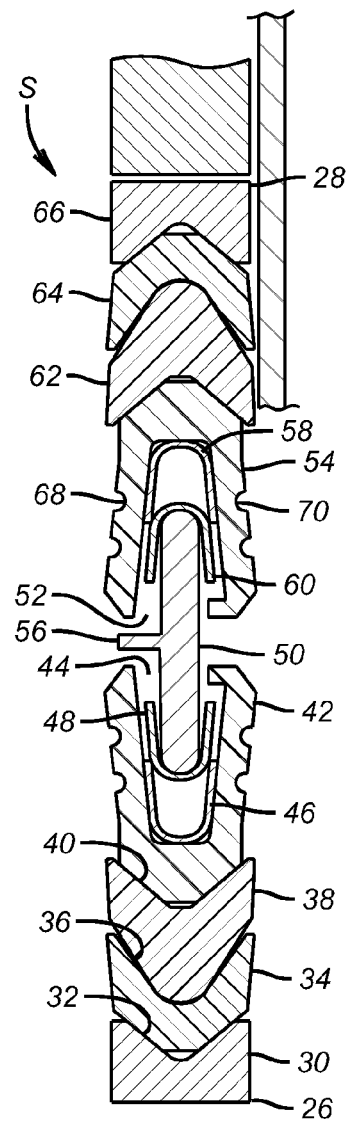
FIG. 3 is a section view of the seal of the present invention in a position before extreme temperature and pressure conditions are applied.

Referring to FIG. 3, the seal S of the present invention is shown without the tool that it would be secured to. The seal bore into which the seal S is to be inserted is also omitted on the basis that those skilled in the art are readily familiar with downhole tools and seal bores into which seals such as seal S are inserted. For similar reasons, the surface wireline equipment and the wireline are omitted due to their familiarity to the person skilled in this art. It should be noted that seal S can be used on a subsurface safety valve that can be delivered on wireline. This is only the preferred use and those skilled in the art will recognize that the seal S can be used with a broad variety of tools and delivered downhole in a variety of ways other than a wireline. Seal S is preferably used in applications of sealing in a seal bore downhole under conditions of high pressure and temperature differentials. Seal S can withstand differentials in pressure in either direction in excess of 13,500 PSI and temperatures well in excess of 350 degrees Fahrenheit.

The components will be described from the downhole end 26 to the uphole end 28. A female adapter 30 has an uphole oriented notch 32, which is preferably v-shaped. Located in notch 32 is a chevron shaped ring 34 with a notch 36 oriented in an uphole direction. Mounted in notch 36 is chevron shaped ring 38 with a notch 40 oriented in an uphole direction. Lower seal 42 sits in notch 40 and has an uphole oriented opening 44 in which is disposed one or more generally u-shaped spring rings such as 46 and 48 that are shown stacked on each other with their respective openings oriented uphole. Spring rings 46 and 48 are preferably mounted within opening 44 and in an abutting relation. Inserted into opening 44 and opening 52 of upper seal 54 is ring 50. Ring 50 has a radial component 56 extending toward the downhole tool (not shown). Located preferably within opening 52 are stacked and abutting spring rings 58 and 60, which are preferably identical to spring rings 46 and 48 except that they are disposed in a mirror image relation to them. In fact, the upper portion of the seal S above the ring 50 is the mirror image of the previously described components that are located below ring 50. In the preferred embodiment going uphole or downhole from ring 50 the hardness of the rings going from seal 42 to ring 38 to ring 34 is progressively harder. The same goes for their mirror image counterparts, seal 54, ring 62, ring 64, and female adapter 66. The preferred material for the female adapters 30 and 66 is Inconel 718. For ring 64 and its counterpart ring 34 the preferred material is virgin polyetheretherketone. For ring 62 and its counterpart ring 38 the preferred material is a PTFE (Teflon) with 20% polyphenylenesulfide and some carbon. The preferred material for the seals 42 and 54 is a PTFE (Teflon) flourocarbon base with 15% graphite.

Seals 42 and 54 could have one ore more interior 68 or exterior 70 notches to promote sealing contact with the tool (not shown) and the seal bore (not shown) respectively. These notches promote some flexibility in response to pressure or thermal loads.

Figure 4:
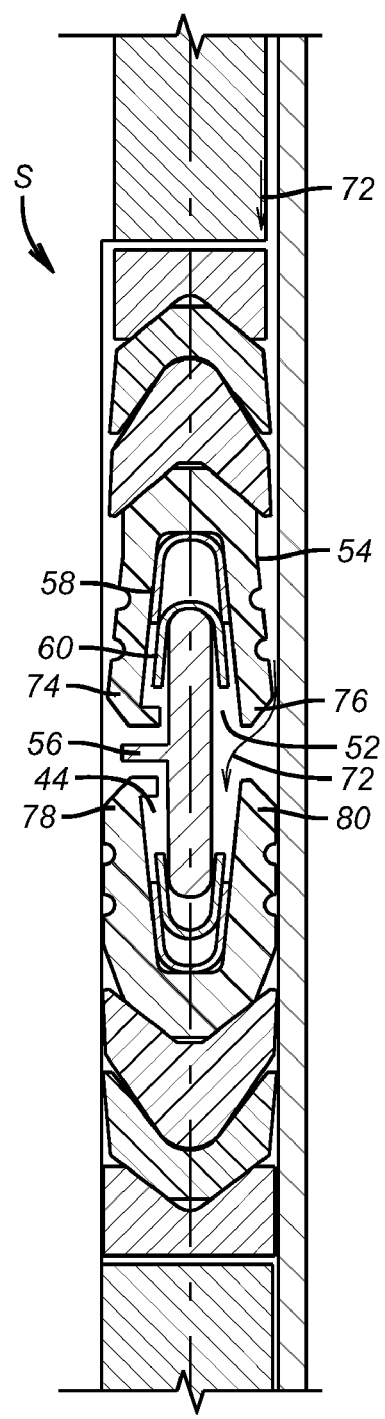
FIG. 4 is the view of FIG. 3 shown under fully loaded conditions.
Figure 5:
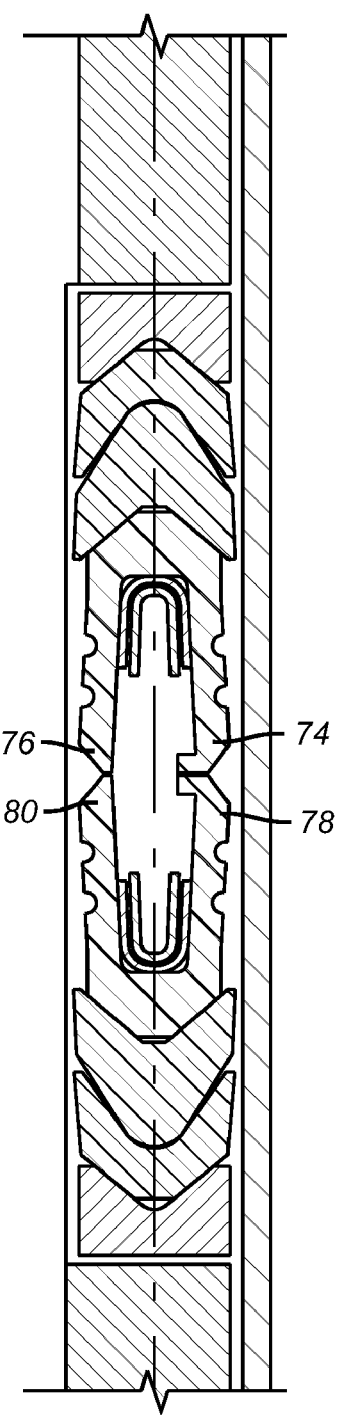
FIG. 5 is a view showing how the seal of the present invention would collapse if the central ring were to be omitted.

The operation of the seal S under a pressure differential from uphole is illustrated in FIG. 4. Arrow 72 represents such pressure from uphole going around seal 54 because its opening 52 is oriented downhole. The wings 74 and 76 flex toward each other responsive to the pressure differential. The seal 54 is moved with respect to ring 50. This movement allows the spring rings 58 and 60 to become more nested and to apply a greater spread force against wings 74 and 76. However, ring 50 also prevents collapse of spring rings 58 and 60 because the described movement has resulted in positioning ring 50 in the openings defines by generally u-shaped spring rings 58 and 60. For that same reason, wings 74 and 76 are prevented from collapse toward each other. Meanwhile, the pressure represented by arrow 72 enters opening 44 with the result that ring 50 is pushed into spring rings 46 and 48 to not only splay apart the wings 78 and 80 but also to keep such wings from collapsing and permanently deforming due to movement of ring 50 into the openings defined by nested spring rings 46 and 48. Ring 50 pushes the spring rings 46 and 48 into a more nested relation but at the same time, its presence in their openings prevents collapse of not only spring rings 46 and 48 but also of wings 78 and 80 to their immediate exterior. Another benefit of ring 50 is that it is of the appropriate length to prevent wings 74 and 76 from contacting wings 78 and 80 under maximum loading conditions. Contact at such high temperatures and pressures could fuse the wings together with a seal failure being a possibility. This is illustrated in FIG. 5 where the ring 50 has been eliminated and wings 74 and 76 have contacted wings 78 and 80. The spring rings in FIG. 5 have all buckled and are permanently deformed. This seal is likely to be in failure mode.

Another advantage of having the ring 50 is that upon insertion of the downhole end of seal S into a seal bore, ring 50 adds some rigidity to that portion of seal S already inserted into the seal bore to act as a centralizer for the remaining portions of seal S to facilitate its insertion without damage. Radial component 56 also helps in the centralizing function for insertion of seal S into a seal bore (not shown).

Those skilled in the art will appreciate that while FIG. 4 illustrates a pressure differential from uphole that the response of seal S to a differential pressure from downhole is essentially the mirror image of what was described as the situation in FIG. 4. The design of seal S is unique in high temperature and pressure service and one such feature is the internal spring component. While spring rings having a generally u-shaped cross-section have been illustrated other cross-sectional shapes for the spring rings are contemplated as long as the response is to splay out the wings while exhibiting resiliency to return to a neutral position when the extreme pressure or temperature conditions are removed. The use of a separation ring to keep the wings apart and to prevent their collapse and the collapse of the spring rings inside them allows the seal S to withstand cycles of temperature and pressure extremes and continue to be serviceable. The placement of the components in a nesting relation in conjunction with ring 50 and radial component 56 helps to centralize seal S with respect to the downhole tool to which it is mounted as well as to facilitate its insertion into a seal bore. This is because the downhole end 26, upon entering the seal bore centralizes the seal S so that the rest of it is simply advanced into the seal bore without damage.

While the seal S is ideal for high pressure and temperature applications, it can also be serviceable in less severe environments and can be delivered into a seal bore by a variety of conveyances such as coiled tubing, rigid pipe as well as wireline, among others. Its construction makes it easily insertable in a wireline application, when minimal force is available get the seal S into the seal bore.

The foregoing disclosure and description of the invention are illustrative and explanatory thereof, and various changes in the size, shape and materials, as well as in the details of the illustrated construction, may be made without departing from the spirit of the invention.

We claim:

1. A seal assembly for sealing an annular space between tubulars downhole and subject to pressure differentials from at least one of an uphole and a downhole direction, comprising:

an assembly of at least one upper seal and lower seal separated by a middle seal wherein said upper and lower seals are disposed about said middle seal said upper and lower seals are disposed in a mirror image about said middle seal;

said upper and lower seals comprise diverging legs defining an opening in between said legs;

said opening on said upper seal is oriented uphole such that pressure differentials from uphole toward downhole spreads said legs of said upper seal across the annular space.

2. The assembly of claim 1, wherein:
said middle seal comprises an elastomeric seal.

3. The assembly of claim 2, wherein:
said opening on said upper seal is oppositely oriented from said opening on said lower seal.

4. The assembly of claim 2, wherein:
said upper and lower seals are made of a different or same material.

5. The assembly of claim 2, wherein:
said middle seal is disposed between adaptors that conform to the middle seal shape on one side and the shape of a respective adjacent upper or lower seal on the other side.

6. The assembly of claim 1, wherein:
said opening on said lower seal is oriented downhole such that pressure differentials from downhole toward uphole spreads said legs of said upper seal across the annular space.

7. The assembly of claim 6, wherein:
said lower seal comprises a plurality of nested seals.

8. The assembly of claim 7, wherein:
adjacent lower seals are made of different or same materials.

9. The assembly of claim 8, wherein:
said upper seal comprises a plurality of nested seals.

10. The assembly of claim 9, wherein:
adjacent upper seals are made of different or same materials.

11. The assembly of claim 6, wherein:
said upper seal comprises a plurality of nested seals.

12. The assembly of claim 11, wherein:
adjacent upper seals are made of different or same materials.

13. The assembly of claim 6, wherein:
said middle seal is disposed between adaptors that conform to the middle seal shape on one side and the shape of a respective adjacent upper or lower seal on the other side.

* * * * *